Figure 1:
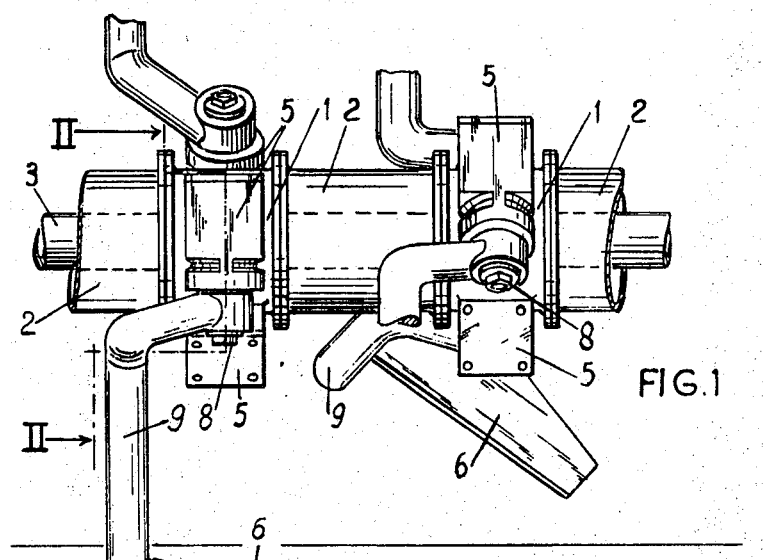

United States Patent

[11] 3,530,945

| [72] | Inventor | Herbert Vissers<br>Nieuw-Vennep, Netherlands |
|---|---|---|
| [21] | Appl. No. | 636,418 |
| [22] | Filed | May 5, 1967 |
| [45] | Patented | Sept. 29, 1970 |
| [73] | Assignee | Landbouwwerktuigen-en Machinefabriek<br>H. Vissers N.V.<br>Nieuw-Vennep, Netherlands<br>a company of the Netherlands |
| [32] | Priority | June 6, 1966 |
| [33] | | Netherlands |
| [31] | | No. 6607805 |

[54] MACHINES FOR CULTIVATING THE SOIL
1 Claim, 2 Drawing Figs.

[52] U.S. Cl. .................................................. 172/95
[51] Int. Cl. ........................................ A01b 33/14, A01b 35/28
[50] Field of Search ........................................ 172/92, 94, 95, 545, 546, 556

[56] References Cited
UNITED STATES PATENTS

| 3,012,616 | 12/1961 | Horowitz | 172/94 |
| 3,128,831 | 4/1964 | Arndt | 172/556X |
| 3,151,685 | 10/1964 | Field | 172/556 |
| 3,199,606 | 8/1965 | Vissers | 172/95 |
| 3,199,609 | 8/1965 | Robinson | 172/556 |

FOREIGN PATENTS

| 238,143 | 3/1962 | Australia | 172/556 |
| 112,460 | 2/1966 | Netherlands | 172/92 |

*Primary Examiner*—Robert E. Bagwill
*Assistant Examiner*—Alan E. Kopecki
*Attorney*—Imirie, Smiley, Snyder and Butrum ABSTRACT: The invention relates to a machine for cultivating the soil and having digging blades arranged in at least one circular set. Said blades each are secured with its arm on a stub shaft, which is rotatably journaled at a hub body for tilting the digging blade in order to have the slice of soil taken up by the blade sliding down thereof in a predetermined position of the blade above the ground. For preventing that the sliding down of the slice of soil from the blade is disturbed by the arm, said arm engages the digging blade at or near that lateral edge thereof, which during rotation of the circular set lies at the top after the blade has been tilted.

Patented Sept. 29, 1970

3,530,945

INVENTOR
HERBERT VISSERS
BY *Smiley & Smiley*
ATTORNEYS

MACHINES FOR CULTIVATING THE SOIL

This invention relates to a machine for cultivating the soil and having digging blades arranged in at least one circular set and said blades each being secured with its arm on a stub shaft, which is rotatably journaled at a hub body for tilting the digging blade, such as has been described in my U.S. Pat. No. 3,199,606. Said tilting movement of the digging blade has for its object to have the slice of soil taken up by the blade sliding down from the blade in a predetermined position of the blade above the ground.

When the arm of the digging blade is secured to the blade substantially in the middle of the width of the blade the sliding down of the slice of soil from the blade is disturbed in a more or less degree by the arm, as the slice of soil is in frictional engagement with the arm during the sliding movement. According to the invention said drawback of tiltable digging blades is removed by having the arm engaging the digging blade at or near that end edge of the blade, which during rotation of the circular set lies at the top after the blade has been tilted. With said arrangement the arm of the blade cannot hinder the sliding down of the slice of soil from the blade. Moreover with a machine having several sets of blades and the blades of which in one set are angularly displaced with respect to that of the adjacent sets there will be a larger space between the arms of the blades of the adjacent sets in tilted position of the blades.

The invention will be further described with reference to the accompanying drawing showing an embodiment of a set of blades according to the invention.

Figure 2:
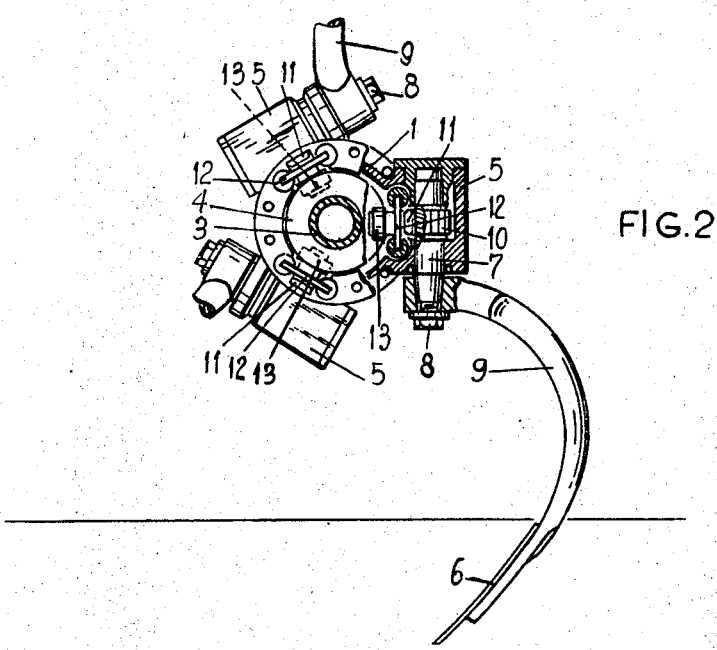

In the drawing FIG. 1 is an elevation of a portion of two adjacent sets of digging blades and FIG. 2 is a side view of the hub body of a set of digging blades.

The hub bodies 1 of the circular sets of digging blades are connected together by tube sections 2 to constitute a hollow shaft having driving means. An axle 3 rigidly supported at the frame of the machine extends through said hollow shaft and has for each set of blades a guide track formed between discs 4 as described in U.S. Pat. No. 3,199,606.

The hub body shown is adapted for carrying a set of three digging blades 6 and has a sleeve 5 at its circumference for the stub shaft 7 of each blade. The arm 9 of the digging blade 6 by means of a nut 8 is secured on the stub shaft 7 rotatably journaled in the sleeve 5. The stub shaft 7 has a circular toothing 10 in meshing engagement with the teeth 11 of a toothed rack 12 axially guided in the hub body. The rack body 12 carries a roller 13 located in the guide track around the stationary axle 3, whereby the rack body 12 is reciprocated in its guides and therefore rotates the stub shaft 7 as described in U.S. Pat. No. 3,012,616.

The arm 9 is secured to the blade 6 near an end edge thereof and is bent at its other end for securing that the radial central plane of the hub body containing the axes of the stub shafts 7 of the digging blades intersects the blade 6 substantially at the middle of the width thereof.

I claim:

1. In a cultivating machine of the type including a driven hub, a series of stub shafts journaled on said hub and arranged circumferentially therearound, an arm secured at one end to each stub shaft, a digging blade fixed to the other end of each arm, each blade having a digging face and opposite end edges and means for oscillating said stub shafts to tilt said blades sequentially from substantially horizontal position as said hub is rotated whereby a slice of soil picked up by the digging face of each blade is allowed to fall back onto the soil surface after the blade is lifted clear thereof, the improvement comprising:

said other end of each arm is secured at that side of the normal plane of its associated blade which is tilted upwardly in response to oscillation of the associated stub shaft as aforesaid, whereby the slice of soil may slide off the blade toward the opposite side thereof unencumbered by engagement with said arm;

the axes of said stub shafts being disposed in a plane normal to the axis of rotation of said hub, said arms extending outwardly of said plane from their points of attachment to said stub shafts with said other ends thereof spaced from said plane; and the main part of each arm is spaced from the first mentioned plane, a bent portion of each arm connecting the main part of the arm to said one end of the arm.